March 20, 1928.  
F. J. MacDONALD  
1,663,457  
METHOD AND APPARATUS FOR MAKING FOOTWEAR  
Filed April 9, 1923  
6 Sheets-Sheet 1

FIG. 1.

Inventor,  
Frank J. MacDonald  
By Robert McPierson  
Atty.

March 20, 1928.  1,663,457
F. J. MacDONALD
METHOD AND APPARATUS FOR MAKING FOOTWEAR
Filed April 9, 1923   6 Sheets-Sheet 4

Inventor
Frank J. MacDonald
By Robert M. Pierson
Atty.

March 20, 1928.

F. J. MacDONALD 1,663,457

METHOD AND APPARATUS FOR MAKING FOOTWEAR

Filed April 9, 1923

Inventor,
Frank J. MacDonald.
By Robert McPherson
Atty.

Patented Mar. 20, 1928.

1,663,457

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING FOOTWEAR.

Application filed April 9, 1923. Serial No. 630,796.

This invention relates to apparatus for applying pieces of stock to lasts in the making of rubber footwear and is an improvement upon the invention described and claimed in my copending application Serial No. 582,884, filed August 19, 1922.

My general object in the present invention is to provide improved apparatus for making rubber footwear. More specific objects are to provide, in such apparatus, simplicity of construction and operation, accuracy of manipulation of the work, and faster production.

Of the accompanying drawings:

Fig. 9 is a vertical section on line 9—9 of Fig. 2.

General description.

The embodiment of my invention herein described comprises means for receiving and holding horizontally a rubber shoe-upper, in an extended and substantially flat condition, means for receiving a last, which preferably comes to the machine with a rubberized fabric shoe-lining and an insole in place thereon, and for presenting said last in an inverted position to the upper, from above, and pressing it downward against the upper while the latter is held only by its margins, to cause the stretchable upper to take the form of and be fitted about the last; means for fitting the toe-margin of the upper about the edges of the sole; means for twisting the wings or heel portions of the upper and applying them successively to the heel portions of the last; means for trimming excess stock from said heel-portions of the upper as they are successively applied to the last; and means for rolling the seam formed at the junction of said heel portions.

Last-holding and manipulating mechanism.

Referring to the drawings, 10 is a frame comprising, near its top, a horizontal plate 11 (Fig. 9) formed with a slot 12 permitting the free passage of a last-holding arm 13, of irregular shape, loosely pivoted on a rock-shaft 14 mounted in upstanding brackets 15, 15 on the rear of the frame, the front end of said arm, extending upward through said slot, having secured thereon a forked last-clamping member 16 adapted to receive and straddle the ankle portion of a last presented thereto from above. 17 (Fig. 9) is a pull spring connecting the arm 13 with the plate 11 and adapted yieldingly to hold the forked member 16 in an elevated position so that it will firmly engage the last when depressed by the latter.

Figures 4, 5:
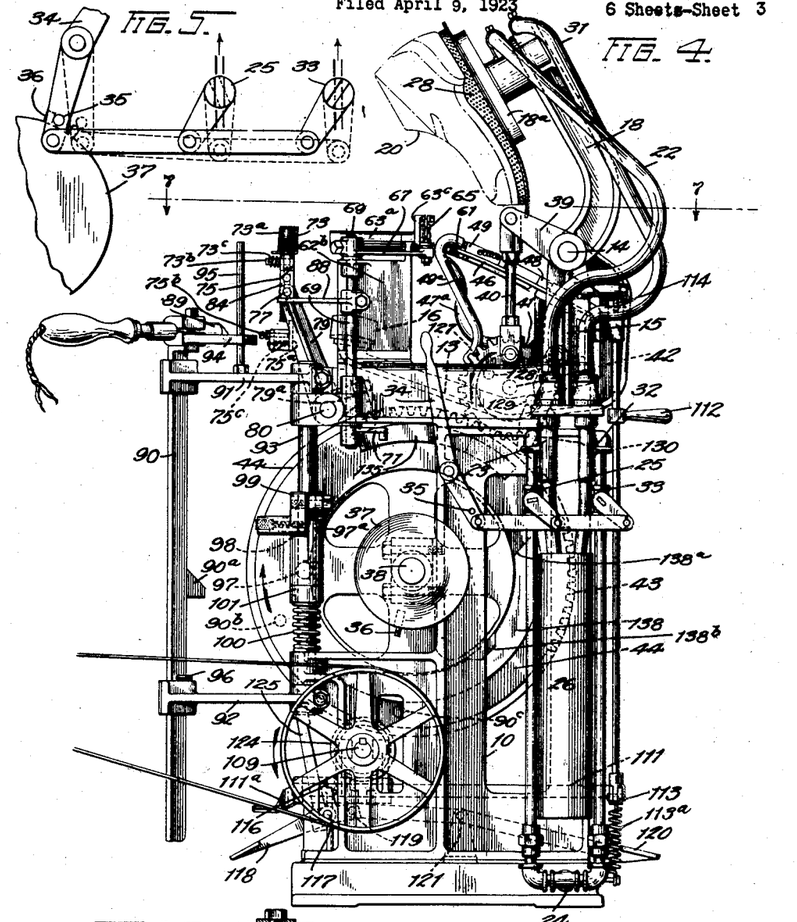
Fig. 4 is a side elevation of the machine as viewed from the right of Fig. 2.
Fig. 5 is a diagrammatic side elevation, from the same viewpoint as in Fig. 4, of an automatic valve-actuating mechanism.

For receiving the last from the hand of the operator, and presenting it to the upper, which latter is held by means hereinafter described, an arm 18 is secured upon the shaft 14 and provided at its outer end with a suction-head 18ª comprising a pair of vacuum-applying members or suckers 19, 19, preferably of soft rubber, as shown clearly in Fig. 6, said suckers being adapted to hold, by engagement with its sole face, the adhesively covered last 20, and said suckers being in communication, through suitable passages 21, 21 in the head 18ª, with a flexible vacuum pipe 22 leading from an ejector 23 operatively connected with a pressure-fluid supply line 24 and provided with a shut-off valve 25 and a muffler 26.

The suckers 19 traverse a hollow suction-applying structure comprising an outer wallplate 27 having a form complementary to the sole of the last, to seat the latter, and a perforate edge-wall plate 28 following the outline of the sole of the last at a short distance inward therefrom and disposed substantially perpendicular to the sole, said plate 28 being thus adapted, by suction applied through its apertures, to reduce the air pressure on the adjacent side of the margin of an upper applied to the last as hereinafter described and so suck said margin inward about the sole-edge of the last. This is most clearly shown in Fig. 6, the upper being designated 29. The interior of the suction-applying structure 27—28 is in communication, through a passage 30 through the head 18a, with a flexible vacuum pipe 31 leading from an ejector 32 (Fig. 4) operatively connected with the pressure-fluid supply line 24 and provided with a shut-off valve 33 and adapted to discharge into the muffler 26.

The valves 25 and 33 are so provided with operating mechanism, including a hand lever 34 common to the two, as shown clearly in Fig. 5, that when the handle portion of said lever is in its extreme right hand position, with respect to Fig. 4, the valve 25 for the last-holding suckers 19 is open and the valve 33 for the upper-sucking structure 27—28 closed, as shown in full lines in Fig. 5, this position concurring with the mounting of the last on the head 18a by the operator; when the handle end of the lever 34 is moved leftward to the middle part of its range both valves are open, as shown in dotted lines in Fig. 5, this position concurring with the sucking in of the upper margin while the suckers 19 continue to hold the last; and when the handle end of the lever is further moved leftward both valves are closed, so that the ejectors cease functioning and so release the uppered last from the head 18a. 35 is a cam stud on the lower arm of the hand-lever 34, adapted to be engaged by a cam stud 36 on a disc 37 secured on a shaft 38, for automatically effecting the movement of the hand lever from its right hand to its middle position, at the appropriate time in the cycle of operations, to cause the margin of the upper to be sucked in about the sole of the last.

Figure 1:
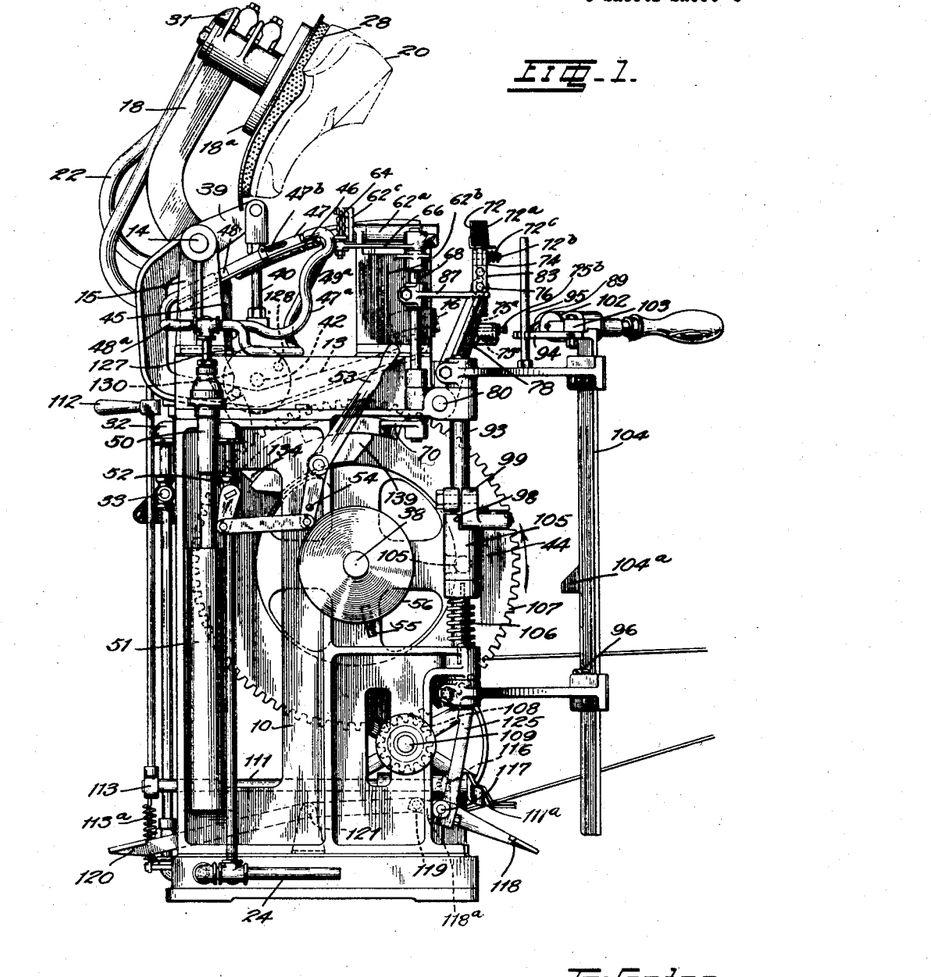
Fig. 1 is a side elevation, as viewed from the left of Fig. 2, of a shoe-uppering machine embodying my invention in its preferred form.
Figure 2:
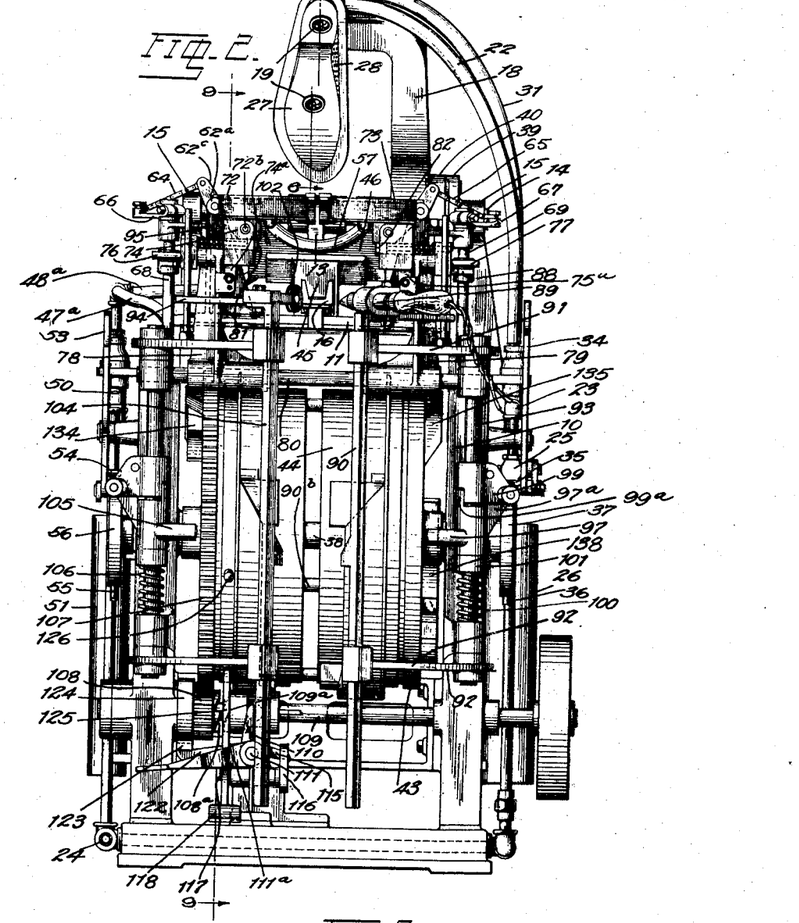
Fig. 2 is a front elevation of the same.
Figure 3:
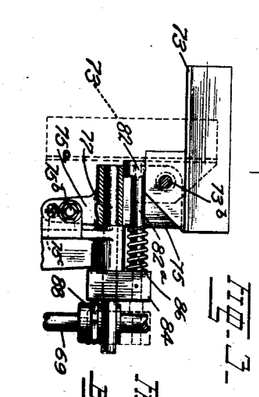
Fig. 3 is a fragmentary elevation, partly in section, of a part of the same, on a larger scale, from the same view-point as in Fig. 2, showing a stock-holding member and means for actuating the same.

To swing the arm from its elevated, last receiving position of Figs. 1, 2 and 4 to its last-presenting position of Fig. 9, and back again, at proper times, the rock-shaft 14 is provided with a rocker-arm 39 connected by a pitman 40 with a spur-gear 41 secured upon a shaft 42, said gear being adapted to be driven intermittently, from one limit to the other of the pitman's range of movement, by an interrupted gear 43 secured upon a timing drum 44, the latter being secured upon the shaft 38. The pitman 40 is adapted to start and stop the last slowly in its swinging movement, which is of advantage in preventing violent contacts and affording smooth operation.

*Upper-supporting and toe-manipulating devices.*

Devices are provided for receiving the upper 29 from the hands of the operator and holding it in position to receive the last as the latter, on the arm 18, is presented from above, said devices comprising a pedestal 45 mounted upon the plate 11 and supporting an inclined plate 46, recessed or cut away to accommodate the toe portion of the work and having suckers 47, 48, 49 mounted on its upper face and adapted to hold by suction the toe-margin of an upper laid thereon, said suckers being in communication, through flexible pipes 47a, 48a, 49a respectively, with an ejector 50 operatively connected with the pressure-fluid supply line 24 and provided with a muffler 51. The ejector 50 is provided with a shut-off valve 52 having an operating mechanism including a hand lever 53 adapted to open said valve when its handle portion is moved by hand to its left hand position with respect to Fig. 1, following the placing of the upper, and to close said valve when thrown in the opposite direction. A stud 54 on the lower arm of said lever is adapted to be engaged by a stud 55 on a disc 56 secured upon the shaft 38, to close said valve automatically and so release the upper when the upper applying operation has been completed and the last is ready to be raised.

Figure 10:
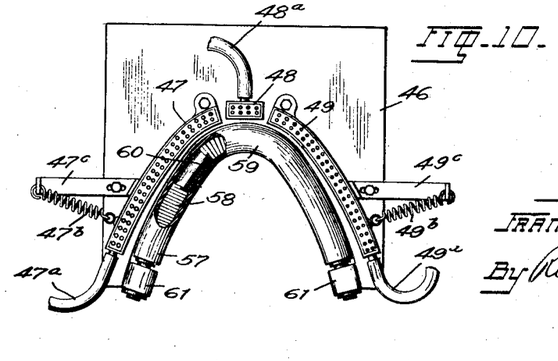
Fig. 10 is a plan view, on a large scale, of a toe-stock-stretching and manipulating device.

The small sucker 48, at the toe of the work, is secured in fixed position upon the plate 46, whereas the longer suckers 47, 49, curved to approximately the contour of the sole margin of the work, are pivotally secured to said plate at their toe ends, as shown most clearly in Fig. 10, and adapted to be swung toward each other by the pull of the upper as the last passes downward between them and so depresses the middle part of the upper and draws it over a roller structure 57 hereinafter described. 47b, 49b are pull springs interposed between the suckers 47, 49 and respective brackets 47c, 49c adjustably mounted upon the plate 46, said springs being adapted to resist the pull of the upper as the latter is drawn onto the last, to provide an approximately uniform tension of the upper, notwithstanding the continued downward movement of its leading portion, and to return said suckers against said brackets, whose inner ends are adapted to serve as stops, when their suction is broken.

The roller structure 57 comprises a helical spring 58 inserted in a rubber tube 59, this flexible assembly being loosely mounted upon a U-bent rod or shaft 60, as shown most clearly in Fig. 10, and the latter being secured at its ends in brackets 61, 61 projecting inward from the plate 46, so that said roller structure follows the outline of the recess of said plate and is adapted to roll upon its curved axis as the upper, resting upon it, is pulled downward between the arms of the U by the descending last, the even stretching of the upper being thereby promoted and the pull of the upper being transmitted to the suckers 47, 48, 49 in a direction substantially parallel with the plate 46.

For supporting the middle portion of the upper while its toe portion is being attached to the suckers 47, 48, 49 and its wings or heel portions to members hereinafter described, a pair of upper-supporting plates 62, 63, shown most clearly in Figs. 7, 11 and 12, each adapted to underly and extend approximately to the longitudinal middle line of the upper and to swing downward as the descending last approaches, are hinged at their outer sides, being there secured to respective rock shafts 62ª, 63ª mounted in brackets 62ᵇ, 63ᵇ rising from the plate 11. For raising said plates to their substantially horizontal upper-supporting positions, and permitting them to fall away as the last approaches, said rock-shafts are provided with respective rocker arms 62ᶜ, 63ᶜ connected by chains 64, 65 with respective levers 66, 67 secured to vertical rock-shafts 68, 69 journaled in suitable brackets on the frame 10 and provided at their lower ends with respective rocker-arms 70, 71 adapted to be actuated by cams hereinafter described on the timing drum 44. Each of the upper-supporting plates 62, 63 is provided on its upper face with a gauge-block, 62ᵈ, 63ᵈ, shown best in Fig. 7, to facilitate the positioning of the upper thereon.

*Heel-stretching and applying devices.*

For receiving the heel portions of the upper as it is placed in the machine and subsequently twisting and stretching said heel portions and applying them successively to the last and joining their edges in a lapped seam, a pair of metal heel-stretchers 72, 73, are faced, except a cutting zone along their seam margins, with fabric, 72ª, 73ª, adapted to be kept tacky by applications of cement, to adhesively anchor the heel margins of the upper, and said heel stretchers are provided with shank plates by which they are hinged at 72ᵇ, 73ᵇ between upwardly extending forks formed on blocks 74, 75 and provided with hinge-springs 72ᶜ, 73ᶜ urging them from their horizontal, upper-receiving positions of Figs. 1, 2, 4 or 7 to their vertical upper-applying positions of Figs. 2, 11 and 12. The heel stretchers are of curved form, as shown most clearly in Fig. 7, so as to conform to the vertical outline of the heel of the last. The blocks 74, 75 are provided with respective stems 76, 77, rotatably mounted in and projecting through bearings at the ends of upwardly extending arms 78, 79, the latter being rotatably and slidably mounted upon a shaft 80 and adapted to be successively swung away from the heel of the last and slid toward the middle line of the machine, against the force of oblique springs 78ᵇ, 79ᵇ (Fig. 7) as to both the swinging and sliding movement, to stretch the heel portions of the upper and apply them progressively to the last. They are adapted then to be swung back toward the last by their respective springs, 78ᵇ, 79ᵇ to further apply the upper thereto, and then further shoved, along the face of the last, after the stock has been severed along the edge of the heel stretcher as shown in Figs. 9 and 11, to apply the seam margins of the upper, with a wiping action directed toward the free edge of the margin, cams hereinafter described being provided, acting against the springs 78ᵇ, 79ᵇ, for so actuating said arms.

Between the forks of the respective blocks 74, 75 are slidably mounted plungers 81, 82 (Fig. 2) adapted to act against the stem plates of the heel stretchers 72, 73 to raise the latter from vertical, upper-applying position to horizontal, upper-receiving position, to slide under said stem plates to lock the heel-stretchers in the latter position, and to be withdrawn from such under-lying position to permit the heel-stretchers again to be swung, by gravity and the hinge springs 72ᶜ, 73ᶜ, to vertical, upper-applying position. Said plungers are provided with respective stems 81ª, 82ª having their outer ends secured in guide-blocks 83, 84 slidably mounted on the projecting outer ends of the stems 76, 77 of the blocks 74, 75 (see Fig. 2). 85, 86 are compression springs on the stems 81ª, 82ª, interposed between the blocks 74, 75 and the guide blocks 83, 84, being thus adapted to urge the plungers toward their retracted positions. For driving them in the opposite direction, to raise the heel stretchers to horizontal, upper-receiving positions concurrently with the raising of the upper-supporting plates 62, 63, arms 87, 88 are secured to the vertical shafts 68, 69 and adapted to act against the guide-blocks 83, 84.

In order that the heel-stretchers may first present the heel-seam margins of the upper to the last adjacent the latter's sole and then apply said margins progressively toward the shank of the last, the blocks 74, 75, being pivoted by their stems 76, 77 on the arms 78, 79, are provided with downwardly extending fingers 74ª, 75ª, urged against stops 74ᵇ, 75ᵇ on the arms 78, 79 by pull springs 74ᶜ, 75ᶜ connecting said fingers with said stops.

*Heel-trimming device.*

Figure 11:
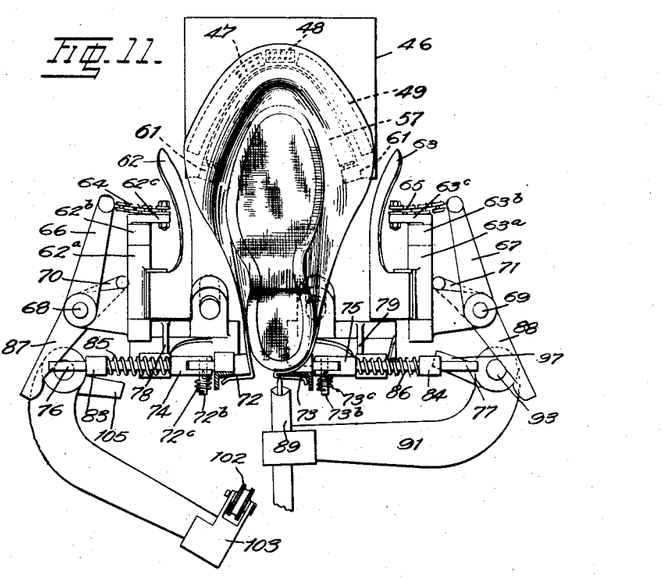
Fig. 11 is a plan view of the work and adjacent parts of the machine, showing a heel-stock-applying and cutting mechanism in operative positions.
Figure 12:
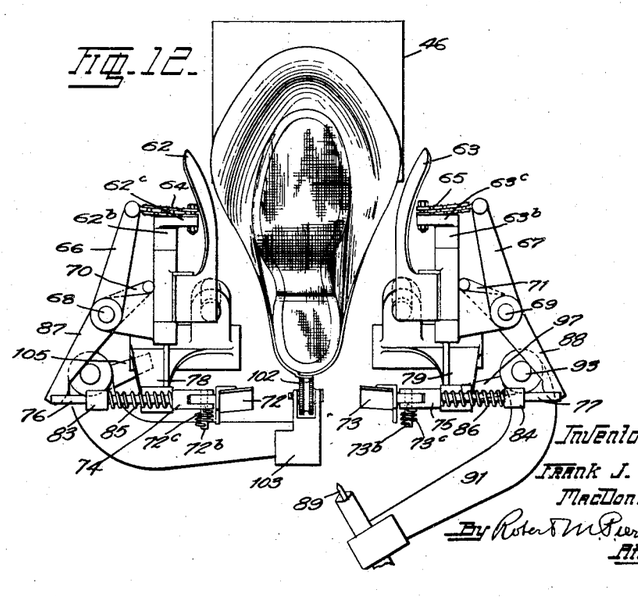
Fig. 12 is a similar plan view showing a seam-roller in operative position.

For trimming excess stock from the heel margins of the upper, an electrically heated knife 89, shown in operation in Figs. 9 and 11, is adjustably secured on the upper end of a vertical bar 90 slidably mounted in the ends of a pair of horizontal arms 91, 92 secured on a vertical rock-shaft 93 mounted in suitable brackets projecting from the frame of the machine, said shaft being adapted to be turned by means hereinafter described to swing said arms toward and from the work to present and retract the knife, and said bar being adapted to be raised and allowed to fall, to cause the knife 89 to cut the stock successively against the outer faces of the heel stretchers, 72, 73, as shown in Figs. 9 and 11, by cam dogs, 90$^b$, 90$^c$ mounted between the two sections of the drum 44, said cams acting against a lug 90$^a$ formed on said bar. 94 is an arm extending horizontally from the upper end of the bar 90 and having a forked outer end slidably fitting on a vertical guide-bar 95 rising from the upper arm 91, to prevent twisting or cramping of the bar 90 by the force of the knife against the work. 96 (Figs. 4 and 9), is a stop-pin on the bar 90 adapted to abut the lower arm 92 to limit the downward movement of the bar 90 and knife 89 thereon.

The means for swinging the arms 91, 92 toward the work comprises a cam arm 97 (Figs. 2 and 8) rotatably mounted on the vertical rock-shaft 93 and having a projection or heel 97$^a$ on its hub portion acting against a spring-backed plunger 98 in a clamp 99 on said rock-shaft, said cam arm being adapted to be actuated by a cam hereinafter described, to swing the knife supporting structure toward the work, and said spring-backed plunger being adapted to permit yielding play of the arms 91, 92 to allow the knife to follow the contour of the work. To stop the clamp 99 and the cam arm 97 against the rotative force of the plunger 98, their hub portions are formed with interlocking portions as shown at 99$^a$ (Fig. 2).

For swinging the knife-supporting structure away from the work, a torsion-spring 100 is mounted upon the shaft 93 and interposed operatively between a collar 101 on said shaft and one of the latter's brackets.

*Seam-rolling device.*

For rolling the lapped seam formed by the heel stretchers a knurled roller 102 is journaled on an arm 103 adjustably secured on the upper end of a bar 104, said bar being formed with a lifting lug 104$^a$ adapted to be engaged by a cam dog 104$^b$ on the drum 44. The supporting and actuating means for the roller 102 correspond to those for the trimming-knife 89 as above described, the cam arm for swinging the roller mounting toward the work being shown at 105 and the torsion spring for retracting it at 106.

*Driving and timing mechanism.*

For driving the timing drum 44, secured upon the shaft 38, said drum is provided with a spur gear 107 meshed with a pinion 108 loosely journaled upon a belt driven main drive shaft 109 and formed with a clutch hub 108$^a$ (Fig. 2) adapted to be engaged by a clutch member 109$^a$ splined on said shaft and provided with a shipper lever 110 secured on a rock shaft 111, the latter being adapted to be turned, to engage the clutch, by depressing a treadle 111$^a$ secured to its front end or by lifting a handle 112, at the rear of the machine, said handle being secured to a vertical link connecting an arm 113 on shaft 111 with a guide arm 114 pivoted to the upper part of the machine frame, and the arm 113 being connected with the base of the machine by a pull spring 113$^a$ adapted to urge the shaft 111 toward the declutched position.

The clutch, when engaged, is adapted to be latched in engagement by a finger 115 (Fig. 2) projecting from the shaft 111 and adapted to be held in an elevated position by a latch-pawl 116 secured on a shaft 117 which also has secured thereon a treadle 118 extending to the front of the machine and a rearwardly extending arm 118$^a$ joined by a sliding pivot 119 with the front arm of a two armed treadle lever 120 fulcrumed on a bracket at 121, its rear arm extending to the rear of the machine, so that depressing the treadle portion of either of said treadle levers, against the force of a pull spring 118$^b$ (Fig. 9) connecting the arm 118$^a$ with the base of the machine, will withdraw the latch pawl 116 and permit the spring 113$^a$ to throw out the clutch 108$^a$—109$^a$.

122 is a brake arm secured to the shaft 111 and provided at its extremity with a brake shoe adapted to stop the drum 44 promptly when the clutch is disengaged, by braking action against a brake drum 124 secured to the pinion 108. Secured on the shaft 117 is an upwardly projecting cam arm 125 adapted to be actuated by a stud 126 on the drum 44 at the end of each cycle of operations, to withdraw the latch pawl 116 and so stop the machine.

For assuring that the pitman gear 41 on the shaft 42 will be stopped and held accurately in position to be remeshed with its interrupted driving gear 43 on the drum 44, a disc 127 is secured on said shaft 42 and provided on its side face with two oppositely positioned studs 128, 129, adapted in succession to be caught by a notched pawl 130 pivoted on the plate 12 at 131 and yieldingly held in position to engage said studs by a pull spring 131 (Fig. 9) connecting it with the plate 12. 132, 133 are cams secured on the drum 44 and adapted to engage said pawl to release the pitman gear 41 when it is about to be remeshed with its interrupted driving gear 43.

Cams and their operation.

Figures 7, 8:
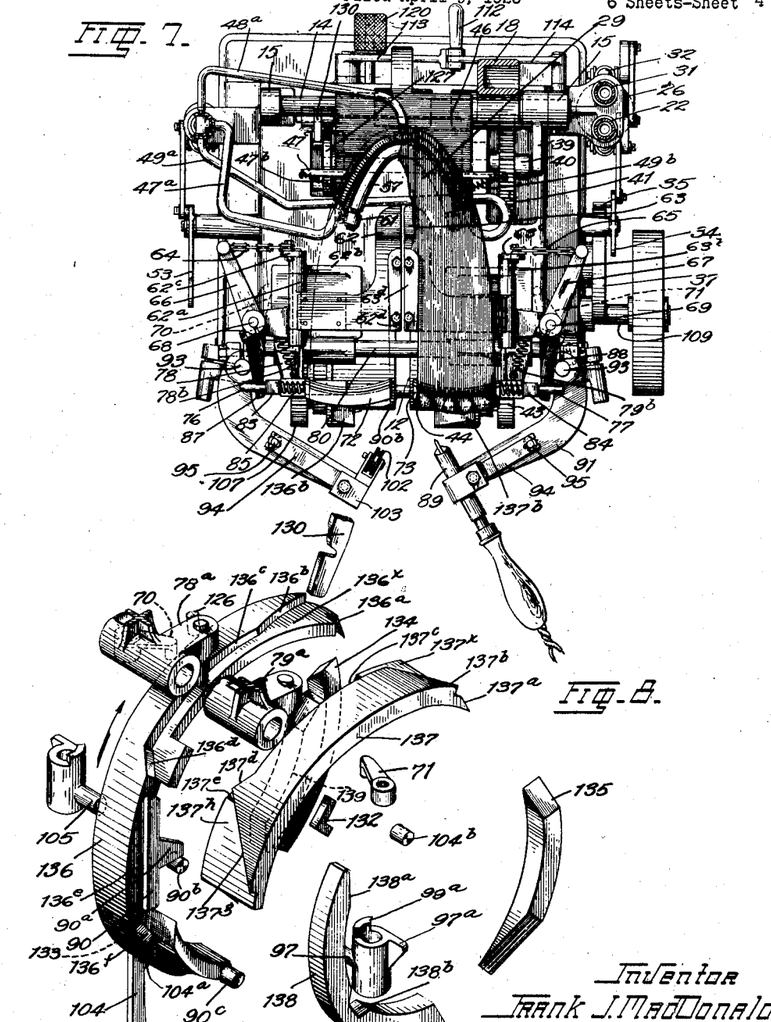
Fig. 7 is a horizontal section, on line 7—7 of Fig. 4, with an upper in place and partly broken away.
Fig. 8 is a detached, perspective view of a set of cams and their cam-followers adapted to actuate certain parts of the machine.
Figure 8:
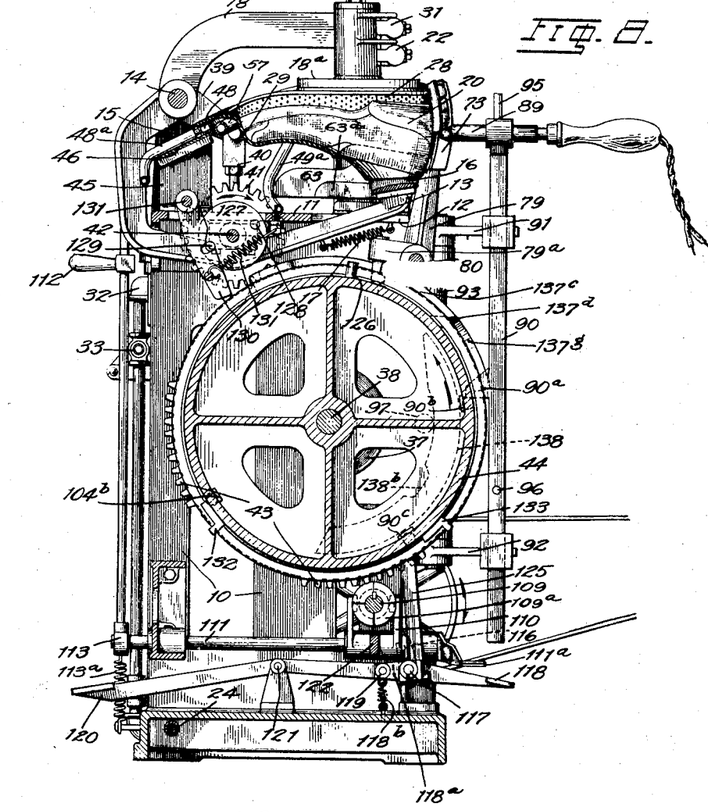

Referring especially to Fig. 8, where the principal cam devices of the drum 44 are shown in detached perspective, 134, 135 are cams which are carried on the end faces of the drum and are adapted simultaneously to actuate the arms 70, 71 (see Figs. 1 and 4) on the vertical shafts 68, 69 respectively to lift the upper-supporting plates 62, 63 and at the same time turn the heel-stretchers from vertical, upper-applying position to horizontal, upper-receiving position, and to permit a reverse movement of said plates and heel stretchers, by gravity and the force of the springs $72^c$, $73^c$, 75, 76, when said cams pass from said arms 70, 71.

Cams 136, 137 on the cylindrical face of the drum are formed with simultaneously-acting, rising faces $136^a$, $137^a$, followed by cylindrical faces $136^x$, $137^x$, adapted to lift respective arms $78^a$, $79^a$ projecting from the hubs of the heel-stretcher arms 78, 79 to swing said heel-stretcher arms simultaneously and hold them forward, heelward with respect to the last, against the force of the oblique springs $78^b$, $79^b$. The cam 137 is formed also with an oblique, upstanding face $137^b$ adapted to slide the adjacent heel-stretcher arm 79 nearly to the center line of the last concurrently with its heelward swinging movement imparted by the cam-face $137^a$, and with a circumferential, upstanding face $137^c$ adapted to hold said arm at such station while the face $137^x$ passes from under the arm $79^a$ and permits the heel-stretcher to be swung against the last by the obliquely disposed pull spring $79^b$ (Fig. 7) connecting the heel-stretcher arm 76 with a part of the frame, the oblique position of said spring being such as to act in opposition to the several faces of the cam 137, as to both the swinging and the sliding movement of said heel stretcher arm. The cam 137 also is formed with an oblique, upstanding face $137^d$ in continuation of the face $137^c$, for a final, short, inward shove of the heel-stretcher along the heel face of the last to straighten out and apply the heel-seam margin of the upper after it has been trimmed, during the functioning of the cam-face $137^c$, by the knife 89 acting against the outer face of the heel stretcher as shown in Figs. 9 and 11. Then follows a rising face $137^e$ and a cylindrical face $137^h$ on the cam 137, for swinging the heel stretcher away from the last and so holding it while an oblique, upstanding face $137^f$ permits the spring $79^b$ to gradually return the heel stretcher arm, by sliding it upon the shaft 80, to its outermost position, to the right in Fig. 7, where it then swings toward the work and is stopped in upper-receiving position by contact with the plate 12 when the cylindrical face $137^g$ passes from under the arm $79^a$, the cam 135, at this time actuating the arm 71 to force the plunger $82^a$ against and then under the stem-plate of the heel stretcher 73 to turn the latter and to hold it in horizontal, upper receiving position, as will be best understood by reference to Fig. 2. Such actuation of the arm 71 also raises the upper-supporting plate 63, by way of the chain 65, concurrently with the lifting of the plate 62 by similar mechanism at the opposite side of the machine.

The cam 136, for actuating the other heel-stretcher, 72, is formed with an oblique upstanding face $136^b$ adapted, by contact with the arm $78^a$, to slide the heel stretcher arm 78 about half way inward while the first arm, 79, is shoved nearly all the way, then with an upstanding face $136^c$ adapted to hold it there while the first-acting heel stretcher fulfills its mission and is withdrawn. Then follows a cam face $136^d$ for further sliding the second-acting heel stretcher nearly to its innermost position, and a face $136^e$ for holding it inward while the passing of the face $136^x$ from under the arm $78^a$ permits the heel stretcher to swing against the last, and also while the trimming knife 89 acts against said heel stretcher. Then follows a short, oblique, upstanding face $136^f$ for giving the final shove to straighten out and apply the heel-seam margin, and appropriate faces for returning the heel-stretcher to upper-receiving position as above described with respect to the first-acting heel stretcher 73.

For turning the vertical rock-shaft 93 to swing the knife supporting structure into operative position successively as the heel stretchers are pressed against the last, a cam 138, mounted on the end face of the drum, is formed with portions $138^a$, $138^b$, adapted successively to act against the arm 97 to swing said structure, against the force of spring 100, while the straight cam faces $137^c$, $136^e$, in succession, are functioning.

The cam for similarly swinging the seam-roller-supporting structure, against the force of spring 106, after both heel stretchers have been withdrawn, is shown at 139 (Figs. 1 and 8). The cam dogs $90^b$, $90^c$, are mounted between the two sections of the drum 44 and adapted successively, as the respective heel-stretchers function, to act against the lug $90^a$ on the knife bar 90 to run the knife 89 up the heel of the work, the knife being then returned downward by its own weight and that of its supporting bar. The similar cam dog $104^b$ for actuating the seam roller 102 by contact with the lug $104^a$ on its bar 104, is likewise mounted between the sections of the drum. The weight of the bar and parts carried thereby serve to return it downward after said dog passes from said lug.

*Operation.*

In the operation of the machine, assuming it be at rest in the positions of Figs. 1, 2 and 4 and the main drive shaft to be idly turning, an operator presents the last 20 to the suckers 19 and plate 27 and moves the handle 34 to its extreme right-hand position as viewed in Fig. 4, thereby holding the last by suction applied through the flexible pipe 22, while the margin-sucking devices leading to the plate 28 remain inactive.

Preferably at the same time and by another operator, the upper 29 is laid upon the plates 62, 63, and positioned with respect to the gauge blocks 62$^d$, 63$^d$, the suckers 47, 48, 49 are actuated to hold the upper's toe margin, by throwing the handle 53 to the left as viewed in Fig. 1, and the heel portions of the upper are pulled down over the edges of the respective heel stretchers 72, 73 and anchored adhesively to their vertically disposed fabric facings 72$^a$, 73$^a$. The upper is thus held in a generally flat condition, without wrinkles.

The driving clutch 108$^a$—109$^a$ is then thrown in, either by lifting the handle 112 at the rear of the machine or depressing the treadle 111$^a$ at the front, and continues to be held in by the latch pawl 116.

The cam drum being thus driven, the cams 134, 135 simultaneously run from under the arms 70, 71, permitting the upper supporting plates to drop away, while the interrupted gear 43, through the pitman 40, swings the last downward onto the upper, where it is stopped, with the clamping member 16 yieldingly bearing against it, by the said interrupted gear passing out of mesh with the pitman gear 41 and the stud 128 catching in the notch of the pawl 130. The cams 136, 137 at this time initiate the movement of the heel stretchers as above described, the release of the arms 70, 71 from their cam at the same time permitting the plungers 81$^a$, 82$^a$ to be withdrawn by their springs 85, 86, so that as they start their movement about the heel of the last the heel stretchers snap from horizontal to vertical position, on their pivots 72$^b$, 73$^b$, twisting the heel portions of the uppers into appropriate positions to be applied progressively to the last by the further, heretofore described movement of the heel-stretchers.

As such further movement of the heel stretchers is effected, simultaneously at the start and then in succession, the several cams and springs as above described actuate the trimming knife 89 to trim the two heel margins successively and then the seam-roller 102 to roll the lapped seam which is formed by the successive straightening out of the bent seam-margins of the upper by the final, short, margin-applying movements of the respective heel stretchers represented by the cam faces 137$^d$, 136$^d$.

The downward movement of the last into association with the upper, and the heel stretcher movements described, apply the upper smoothly to the last, the suckers 47, 49 being swung inward by the pull of the upper so that the latter is applied under substantially uniform tension about the toe, and the course of the heel stretchers is such that the same effect is obtained at the heel.

Figure 6:
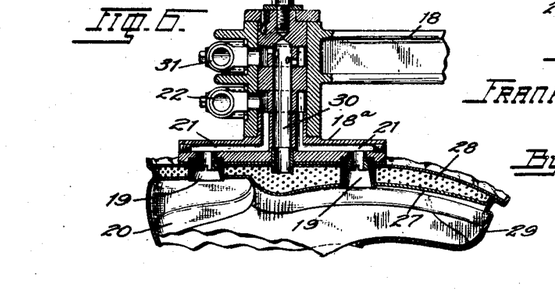
Fig. 6 is a vertical section on line 6—6 of Fig. 2.

After the upper has been so applied, the stud 36 on the disc 37 (Fig. 4) strikes the stud 35 on the lever 34, applying suction to the sole margin of the upper through the plate 28, drawing said margin snugly about the sole-edge of the adhesively covered last and so anchoring it there, as shown in Fig. 6, the suckers 19 also continuing to function.

At approximately the same time that the suction is thus applied to the sole margin through the plate 28 and preferably slightly before such time, as will be apparent in view of the relative positions of the studs or lugs 36 and 55 in Fig. 2, rotation of the shaft 38 causes the lug 55, through intermediate parts, to shut the valve 52 (Fig. 1), breaking the suction in the suckers 47, 49, which are then swung away from the last by their springs, 47$^b$, 49$^b$ (Fig. 10). The cam 133 then releases, and the interrupted gear 43 again drives, the pitman gear 41, raising the last supporting arm to its initial position, while the return movements of the heel stretchers and last-supporting plates are effected, as above described.

The cycle of automatic operations being thus completed, and the drum 44 having returned to its starting position, the stud 126 on said drum contacts the arm 125 and thereby causes the withdrawal of the latch-pawl 116, permitting the spring 113$^a$ to throw out the drive clutch and stop the machine. The finished work is then released, by throwing the hand lever 34 to the extreme left as viewed in Fig. 4, and said work removed, and the cycle of operations as described is repeated.

My invention is susceptible of various modification without sacrifice of all of the advantages thereof, and I do not wholly limit my claims to the exact construction or procedure described.

I claim:

1. The method of making footwear which comprises holding in a spread condition in a determinate position an upper having heel-wing portions, determinately lowering a last thereonto, inverted, so as to stretch the upper about the toe portion of the last by the force of the moving last, and thereafter twisting the heel-wing portions of the upper into substantial parallelism with the last and then swinging them about the heel portion of the last to apply them progressively thereto.

2. The method of building footwear upon a last which comprises holding a piece of stock in a determinate position and in spread condition, lowering the last thereonto, inverted, while holding the last by suction applied to its sole face, and so moving the last as to cause said stock to conform thereto.

3. The method of building footwear upon a last which comprises applying the toe portion of an upper shoe part to the last, swinging a heel portion of said part about the heel portion of the last to apply it progressively thereto up to its heel seam margin, and then applying said margin to the last by a wiping action on its outer face, directed toward the heel seam edge of said margin.

4. The method of building footwear upon a last which comprises applying a portion of an adhesive piece of stock to the last, swinging the free portion of said piece about the last to apply it progressively thereto up to its margin, thereafter trimming said margin, and then applying it to the last by a wiping action on its outer face, directed toward its free edge.

5. The method of building footwear upon a last which comprises applying an upper shoe part to the last with its margins extending past the sole of the last, and drawing its free sole-margin portions inward about the sole-edge by suction.

6. The method of buliding footwear upon a last which comprises holding a piece of shoe stock against a stock-manipulating member by suction applied to its outer face and pulling it onto the last by relative movement between the last and the stock-manipulating member.

7. Apparatus for building footwear upon a last, said apparatus comprising means for holding an upper shoe part in a determinate position and in spread condition, means constrained to move in a determinate course for holding a last inverted and lowering it onto said part, and means for twisting the heel portions of said part and swinging them about the last to apply them progressively thereto.

8. Apparatus for building footwear upon a last, said apparatus comprising means for holding a piece of stock in a determinate position and in spread condition, and suction means adapted to engage the bottom of a last to hold it inverted, the said means being movably mounted for lowering the last onto said piece of stock.

9. Apparatus for building footwear upon a last, said apparatus comprising means for applying the toe portion of an upper shoe part to the last, means for swinging a heel portion of said part about the heel portion of the last to apply it progressively thereto up to the heel seam margin, said means being adapted, by further movement to apply said heel seam margin by pressing it against the last.

10. Apparatus for building footwear upon a last, said apparatus comprising means for applying a portion of an adhesive piece of stock to the last, means for so swinging its free portion about the last as to apply it progressively thereto up to a margin of said piece, said means being adapted by further movement to apply said margin to the last.

11. Apparatus for building footwear upon a last, said apparatus comprising means for applying a portion of an adhesive piece of stock to the last, stock-pulling means for swinging said stock about the last to apply it progressively thereto, and means for trimming said marginal portion before the latter is applied to the last and while it is held by said stock-pulling means.

12. Apparatus for bulding footwear upon a last, said apparatus comprising means for supporting the last with an upper shoe part thereon having a margin projecting past the sole of the last, and vacuum means for sucking said margin about the sole-edge of the last.

13. Apparatus for building footwear upon a last, said apparatus comprising means for holding a piece of shoe stock by suction, and means for introducing it to the last while so held.

14. Apparatus for building footwear, said apparatus comprising means for holding a spread upper in a fixed position to receive a last, and means for presenting a last to said upper and so moving the last as to cause the upper to conform thereto about the toe portion of the last, parts of the upper-holding means being adapted thereafter to swing the heel portions of the upper about the heel portion of the last to apply them progressively thereto.

15. A shoe making machine comprising means engaging the margins of an upper shoe part to hold it spread in a fixed position, means for lowering an inverted last onto said part, and means for supporting the middle portion of said part, the last said means being adapted to move out of the way of the last as the latter approaches.

16. A shoe making machine comprising means engaging the margins of an upper shoe part to hold it spread in a fixed position, means for lowering an inverted last onto said part, and a pair of pivoted members adapted to support the middle portion of said part and to be swung downward and out of the way of the last as the latter approaches.

17. A shoe making machine comprising means for holding a piece of shoe stock in a fixed position, a pivoted arm adapted to be swung from and toward said position, means on said arm adapted to hold a last in an inverted position by engagement with the latter's sole face only, and a last formed to receive shoe-building material on its sole face, the last-holding means being adapted for quick-detachable assembly with the last.

18. A shoe making machine comprising means for holding a piece of shoe stock in a fixed position, a pivoted arm adapted to be swung from and toward said position, and a member on said arm adapted to hold a last by suction applied to the sole face of the last.

19. A shoe making machine comprising means for holding a piece of shoe stock in a fixed position, a pivoted arm adapted to be swung from and toward said position, means on said arm adapted to hold a last by engagement with its sole portion, and suction means on said arm adapted to suck a piece of shoe stock about the sole edge of a last so held upon said arm.

20. A shoe making machine comprising means for holding a piece of stock in a fixed position, and last-manipulating means for moving a last toward said position to engage said stock and to withdraw it therefrom, said last manipulating means comprising a pivoted arm, means on said arm for holding the last, and a pitman operatively connected with said arm, and means for driving said pitman in successive movements substantially from one limit of its stroke to the other.

21. Apparatus for building footwear upon a last, said apparatus comprising means adapted to receive an upper shoe part in a spread condition and hold the same by engagement with its toe margin, and a roller structure adjacent said margin holding means and adapted to act as a guide roller for said part as the latter is tensioned by a last moving past said roller structure.

22. Apparatus for building footwear, said apparatus comprising a pair of yieldingly held structures so disposed as to receive a spread upper shoe part and hold the margin thereof and to yield toward each other as said part is pulled by a last moving between them, and guiding means positioned between them and adapted to permit the passage of the last and to support the part adjacent its margin as it is so pulled.

23. Apparatus for building footwear, said apparatus comprising a pair of yieldingly held structures so disposed as to receive a spread upper shoe part and hold the margin thereof and to yield toward each other as said part is pulled by a last moving between them, a U-curved axle member supported by its end portions between said structures and adapted to underlie said part around the latter's toe margin, and a flexible roller structure mounted on said axle member and adapted to roll thereon, upon a curved axis.

24. Apparatus for building footwear, said apparatus comprising a pair of yieldingly held structures so disposed as to receive a spread upper shoe part and hold the margin thereof and to yield toward each other as said part is pulled by a last moving between them, a U-curved axle member supported by its end portions between said structures and adapted to underlie said part around the latter's toe margin, and means journaled on said axle member so that said part may run on said means as said part is pulled by said last.

25. Apparatus for building footwear upon a last, said apparatus comprising an upper-pulling structure of such unvarying U-form as to lie about the toe portion of a last adjacent the latter's sole, means for holding an upper shoe part in spread condition adjacent said structure, and means for presenting a last to said part and so moving it with relation to said structure as to cause said part to be stretched over the toe portion of the last by said structure.

26. In apparatus for making footwear, a stock-manipulating structure comprising a curved axle member, a helical spring running helically about and journaled for relative rotation upon said axle member, and a tube of flexible material mounted on said spring.

27. In apparatus for making footwear, a stock stretching structure comprising a plate, a pair of suction members pivoted on said plate for sliding movement along its face and adapted to hold the margin of a piece of stock by suction, springs urging said members away from each other, about their pivots, and stops opposed to said springs.

28. In footwear-making apparatus, a heel stretcher comprising a member adapted to anchor the heel margin of an upper shoe part, said member being formed, along the zone of said part's attachment, with a face adapted to serve as a backing for the stock against which the latter may be cut.

29. In footwear-making apparatus the combination of a last, means for supporting the same, a heel stretcher comprising a member adapted to anchor the heel margin of an upper shoe part, said member being formed, along the zone of said part's attachment, with a face adapted to serve as a backing for the stock against which the latter may be cut, means for turning said member from a receiving position to an applying position substantially at right angles thereto and moving it about said last to apply said part progressively thereto, a knife, and means for running said knife on said stock-backing face, when said member is in a determinate position with relation to the last.

30. In foot-wearing-making apparatus the combination of a last, means for supporting the same, a heel stretcher comprising a member adapted to anchor the heel margin of an upper shoe part, said member being formed, along the zone of said part's attachment, with a face adapted to serve as a backing for the stock against which the latter may be cut, means for turning said member from a receiving position to an applying position substantially at right angles thereto and moving it about said last to apply said part progressively thereto, a knife, and means for running said knife on said stock-backing face when said member is in a determinate position with relation to the last, the last said means comprising a slidably mounted knife-supporting member and a yieldingly-impelled structure constituting the mounting for said knife-supporting member.

31. In apparatus for making footwear, the combination of means for supporting a last and a seam rolling device, the latter comprising a yieldingly impelled structure, a roller-supporting member slidably mounted on said structure, and a seam roller journaled on said roller-supporting member.

32. In apparatus for making footwear, the combination of means for supporting a last, a trimming device including a knife adapted to be run along the heel seam portion of stock upon said last, a seam roller adapted to be so run, the mountings for said knife and said seam roller each comprising a slidable member upon which the tool is mounted, and a pivoted structure constituting the mounting for said slidable member, said pivoted structures being adapted to be swung in succession to bring their tools into operation upon approximately the same part of the work.

33. In apparatus for making footwear, the combination of means for supporting a last, a trimming device including a knife adapted to be run along the heel seam portion of stock upon said last, a seam roller adapted to be so run, the mountings for said knife and said seam roller each comprising a pivoted structure, such structures being adapted to be swung in succession from opposite sides of the work, to bring their tools into operation upon approximately the same part of the work.

34. In apparatus for making footwear upon a last, a stock manipulating device comprising a member having a face adapted substantially to fit a portion of the last, an adjacent stock-anchoring face, and, between the two said faces, a face adapted to serve as a cutting plate.

35. In apparatus for making footwear upon a last, the combination of a stock-manipulating member having a face adapted substantially to fit a part of the last, an adjacent stock-anchoring face, and between the two said faces, a face adapted to serve as a cutting-plate, means for so swinging said member about a part of the last as progressively to apply to the latter a piece of stock anchored by said member and to bring said member adjacent the face of the last, and means for further moving said member, along the face of the last, so as to straighten out and apply to the last a margin of said stock resulting from the trimming of the latter against said cutting-plate face.

36. A machine for making footwear, said machine comprising an arm for swinging a last, a pitman for actuating said arm, a gear for actuating said pitman, a mutilated gear for intermittently driving the first said gear, and means for preventing substantial turning of the first said gear while it is out of mesh with the second mentioned gear.

37. A machine for making footwear, said machine comprising an arm for swinging a last, a pitman for actuating said arm, a gear for actuating said pitman, a mutilated gear for intermittently driving the first said gear, a pawl for preventing substantial turning of the first said gear while it is out of mesh with the second mentioned gear, and a cam moving with said second mentioned gear for retracting said pawl as the gears remesh.

38. A machine for making footwear, said machine comprising means for supporting a last, a heel-stretcher adapted to receive and hold the heel portion of a spread upper shoe part in a plane substantially parallel to the sole of the last, to twist it into substantial parallelism with the side face of the last and swing it about the last to apply it progressively thereto, a transverse shaft adjacent the heel portion of the last, and an arm pivotally and slidably mounted on said shaft and constituting a mounting for said heel-stretcher.

39. A machine for making footwear, said machine comprising means for supporting a last, a heel-stretcher adapted to receive and hold the heel portion of a spread upper shoe part in a plane substantially parallel to the sole of the last, to twist it into substantial parallelism with the side face of the last and swing it about the last to apply it progressively thereto, a transverse shaft adjacent the heel portion of the last, an arm pivotally and slidably mounted on said shaft and constituting a mounting for said heel-stretcher, yielding means urging said arm toward the last, about said shaft, and away from the longitudinal middle plane of the last, along said shaft and cam means for actuating said arm against the force of said yielding means.

40. A machine for making footwear, said machine comprising means for bringing a last and an upper shoe part into contact and wrapping said part about the last, including suction applying means for manipulating said part, a rotatable drum, and means on said drum for actuating the several instrumentalities in timed relation.

41. A machine for making footwear, said machine comprising means for bringing a last and an upper shoe part into contact and wrapping said part about the last, means for trimming said part in the course of its application to the last, a rotatable drum, and means on said drum for actuating the several instrumentalities in timed relation.

42. A machine for making footwear, said machine comprising means for bringing a last and an upper shoe part into contact and wrapping said part about the last and joining its heel margins in a lapped seam, a heel seam roller, a rotatable drum, and means on said drum for actuating the several instrumentalities in timed relation.

43. A machine for making footwear, said machine comprising means for bringing a last and an upper shoe part into contact and wrapping said part about the last and joining its heel margins in a lapped seam, a tool, a tool-support slidably mounted for movement of the tool along the heel seam portion of the last, a pivoted structure consituting a mounting for said tool-support and adapted to be swung into and out of operative position, a rotatable drum, and contact means on said drum for driving said tool support when the latter is in operative position.

44. A machine for making footwear, said machine comprising stock-anchoring means for holding an upper shoe part in a determinate position and in spread condition, last-holding means adapted to present a last to said part while the latter is so held, means adapted to support the middle portion of said part and to withdraw therefrom upon the approach of the last, means for swinging the heel portions of said part about the heel portion of the last to apply them progressively thereto and join their edges, means for trimming said heel portions in the course of their application, means for rolling the heel seam, a rotatable drum, and means on said drum for actuating the several instrumentalities in timed relation.

45. In apparatus for making footwear upon a last, upper applying devices including a pair of heel stretchers, each of said heel stretchers comprising a stock-anchoring member adapted to be swung about the last to apply an upper shoe part progressively thereto up to a heel-seam margin of said part and by a further movement along the face of the last to straighten and apply said margin to the last, and means for actuating said heel stretchers in succession so as to join said parts heel margin in a lapped seam.

46. Apparatus for making footwear, said apparatus comprising means for holding a spread upper shoe part in position to receive a last, last-holding means for lowering a last onto said part by engagement with the last's sole portion only and a yielding member adapted to receive, and to give under the pressure of, the shank of the last as it is so presented to said part.

47. Apparatus for building footwear, said apparatus comprising means for holding an upper shoe part in a flat condition in a determinate position, means for supporting a last out of contact with the part so held, and means for so moving one of the said means with relation to the other as to cause the said part to be introduced to the last and applied thereto in a determinate position thereon, said holding means comprising a guide adapted for the said part to run thereover toward the last and hold-back means for tensioning the part as the latter is drawn over the said guide by the relative movement of the last.

48. A machine for making footwear, said machine comprising means, including a pair of heel stretchers, for receiving and holding an upper shoe part in spread condition, means for presenting a last to said part as it is so held, means for so moving said heel stretchers as to apply the heel portions of said part progressively to the last, a rotatable drum, and means on said drum for actuating the several instrumentalities in timed relation.

49. In apparatus for building footwear, the combination of a last, means adapted to hold the latter by suction applied to a face thereof, and means adapted to shape a piece of shoe stock about said last while the latter is so held.

50. In apparatus for building footwear, a structure comprising suction means adapted to hold a last by suction applied to the latter's sole face, and suction means for drawing the sole margin of an upper shoe part inward about the sole edge of the last while the last is held by the first said suction means.

51. In apparatus for building footwear, a structure comprising suction means adapted to hold a last by suction applied to the latter's sole face, suction means for drawing the sole margin of an upper shoe part inward about the sole edge of the last while the last is held by the first said suction means, and actuating means common to the two said suction means.

52. In a machine for making footwear, a master drum adapted to represent one cycle of the operation of the machine by one revolution of the same, an upper supporting and manipulating device, a last supporting and manipulating device, a knife, a rolling down device, means on the drum for operating said devices in sequence, and means for controlling and rotating said drum.

In witness whereof I have hereunto set my hand this 6th day of April, 1923.

FRANK J. MacDONALD.